March 15, 1949.  H. H. VANDERZEE  2,464,538
FLUID PRESSURE OPERATED MULTIPLE CLUTCH
Filed Feb. 27, 1946  7 Sheets-Sheet 1

Inventor:
Harry H Vanderzee.
By John W Darley
Attorney

March 15, 1949.   H. H. VANDERZEE   2,464,538
FLUID PRESSURE OPERATED MULTIPLE CLUTCH
Filed Feb. 27, 1946   7 Sheets-Sheet 3

Inventor.
Harry H. Vanderzee
By, Johnus Darley
Attorney.

March 15, 1949.  H. H. VANDERZEE  2,464,538
FLUID PRESSURE OPERATED MULTIPLE CLUTCH
Filed Feb. 27, 1946  7 Sheets-Sheet 4
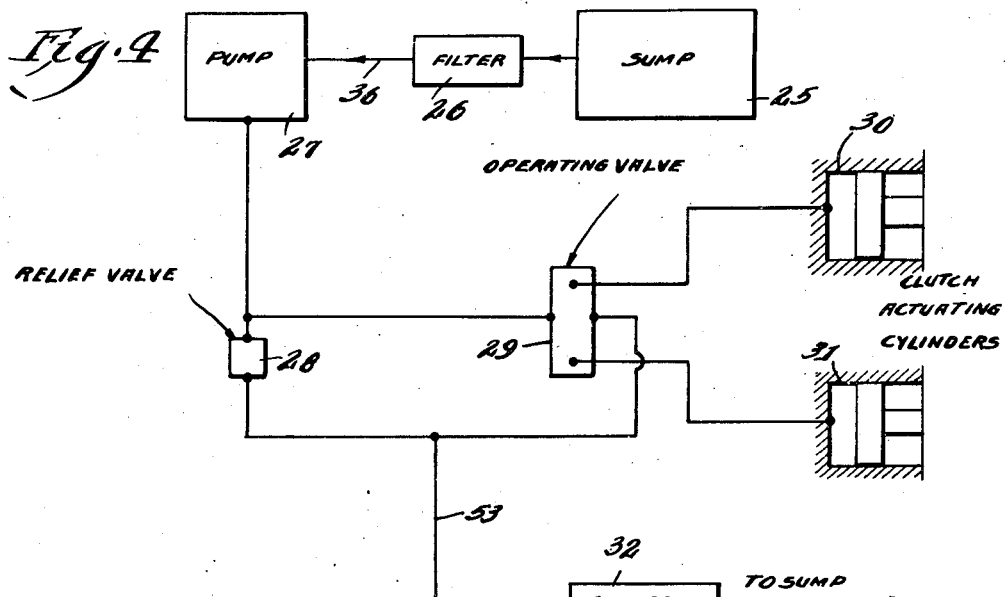
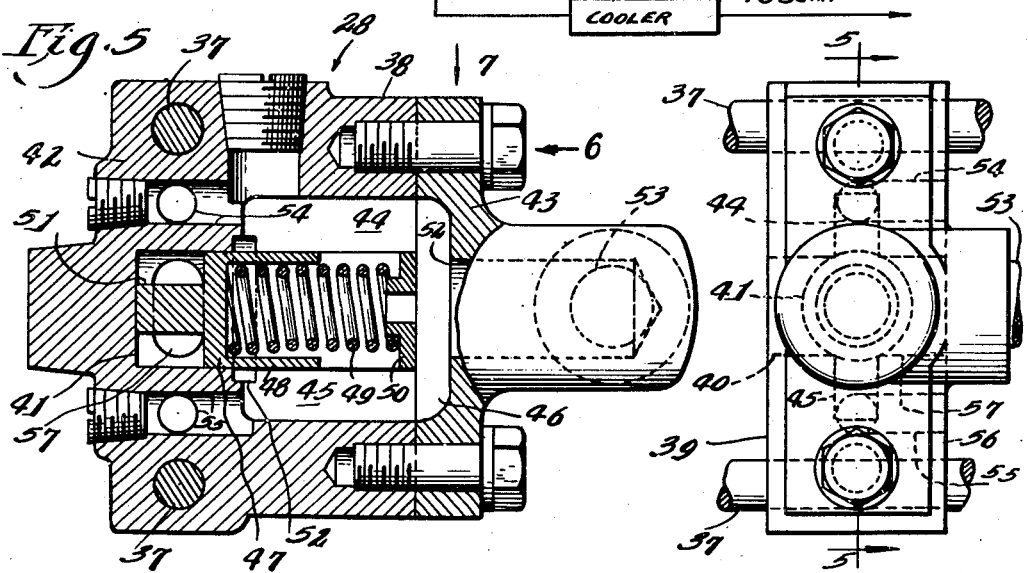
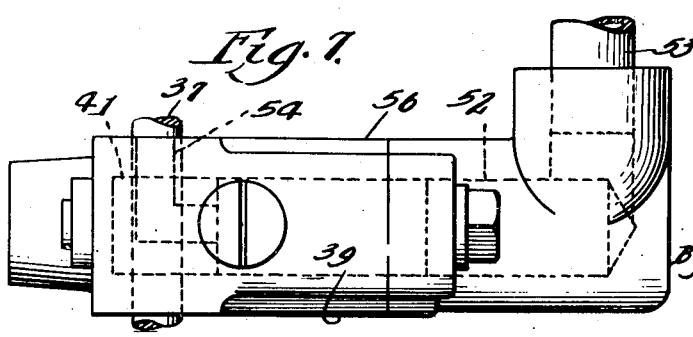
Inventor:
Harry H. Vanderzee
By John W. Darley
Attorney.

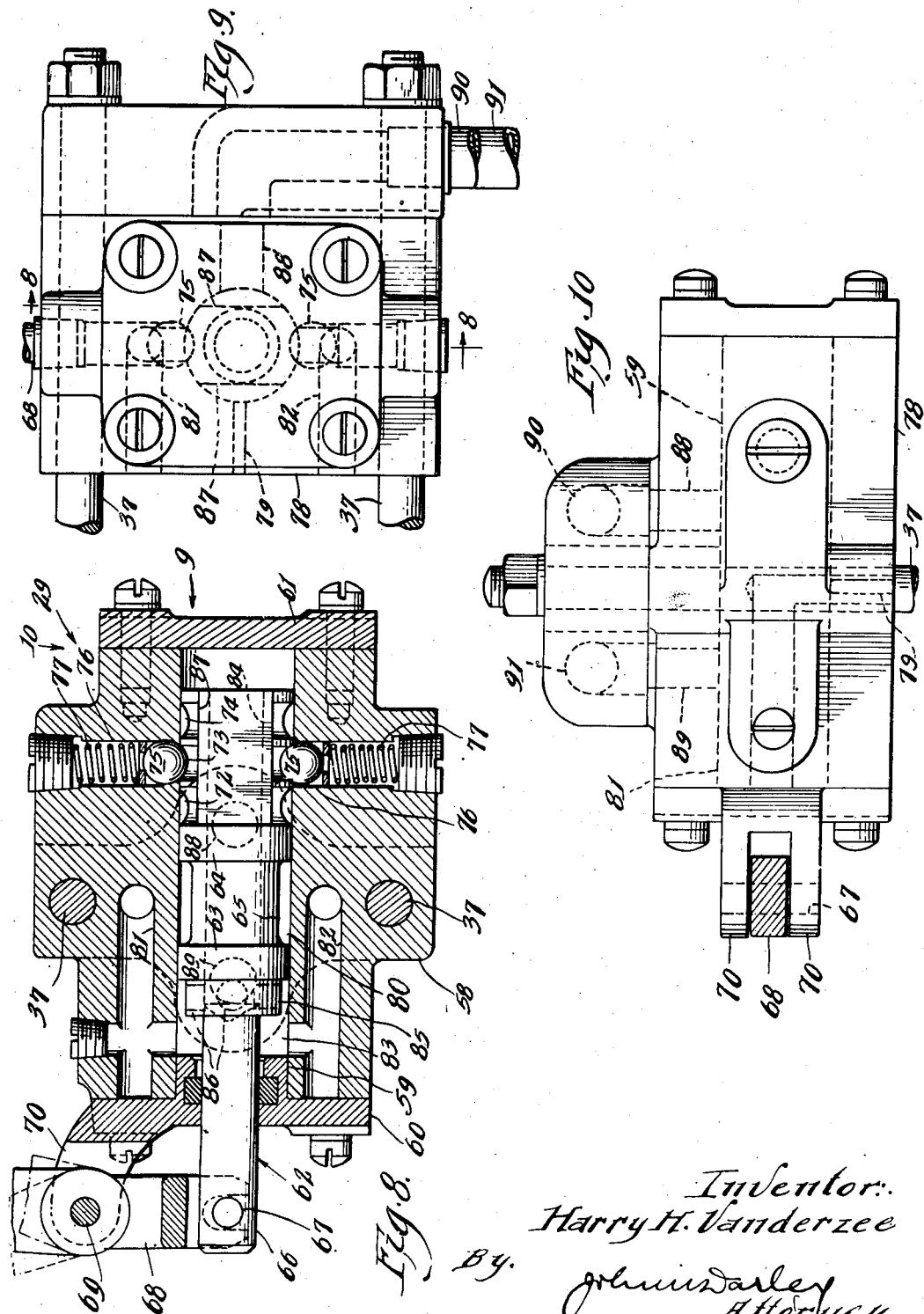

March 15, 1949.  H. H. VANDERZEE  2,464,538
FLUID PRESSURE OPERATED MULTIPLE CLUTCH
Filed Feb. 27, 1946  7 Sheets-Sheet 6
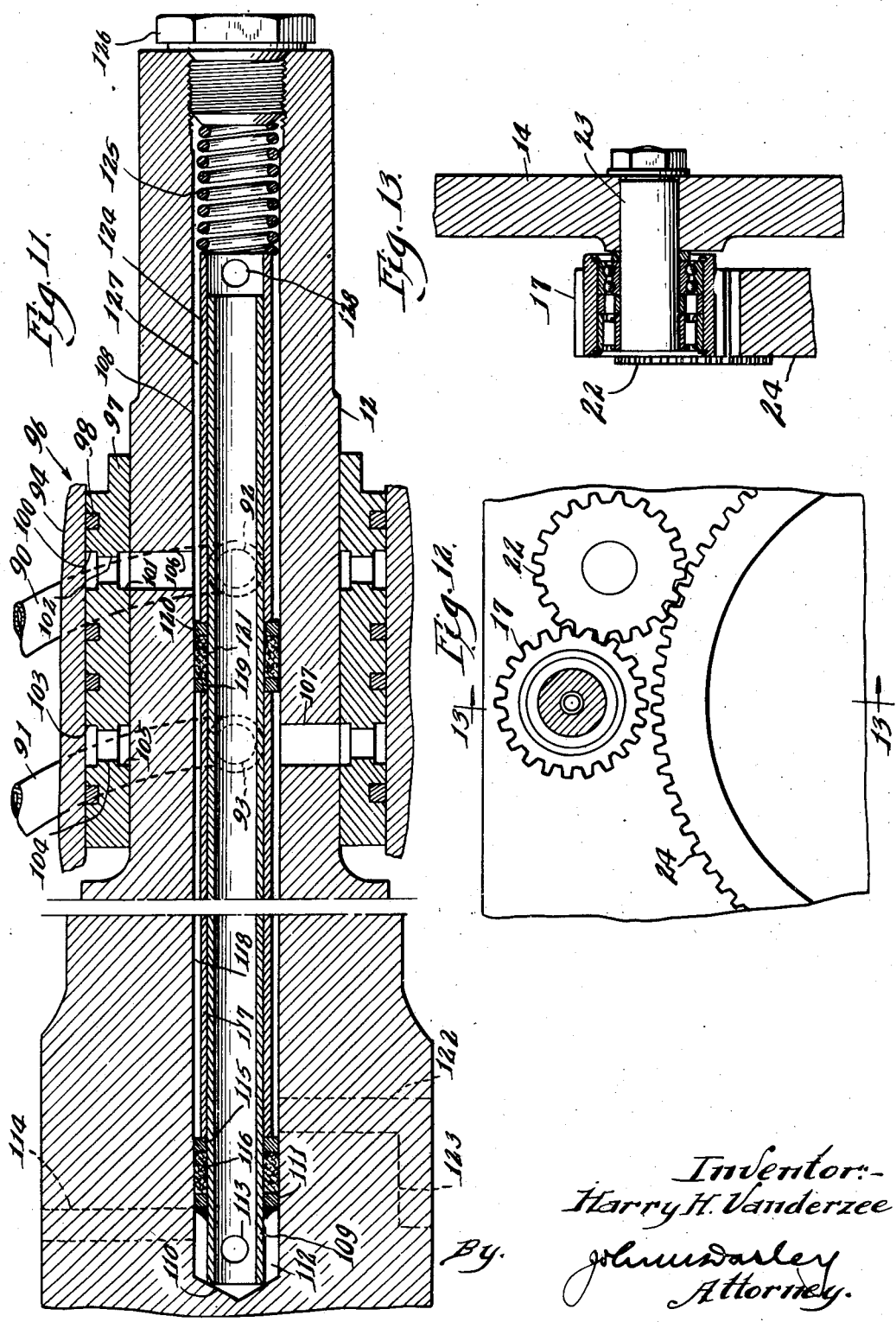
Inventor:-
Harry H. Vanderzee
By
John Darley
Attorney.

March 15, 1949.  H. H. VANDERZEE  2,464,538
FLUID PRESSURE OPERATED MULTIPLE CLUTCH
Filed Feb. 27, 1946  7 Sheets-Sheet 7
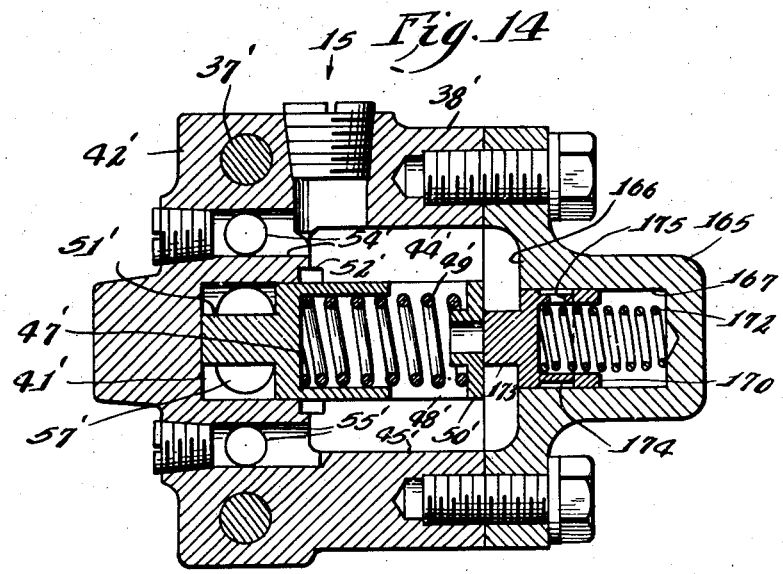
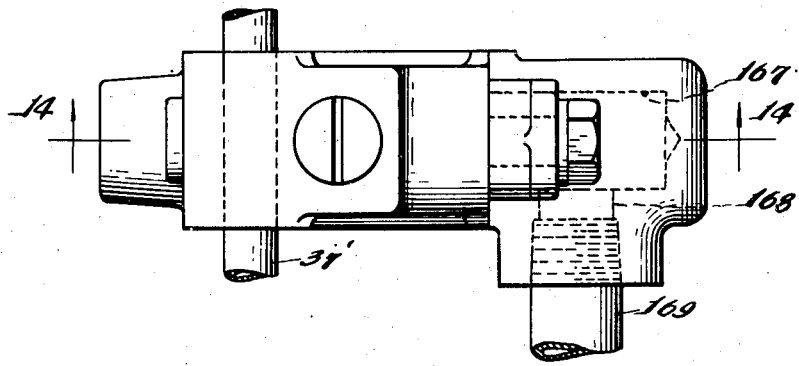
Inventor:-
Harry H. Vanderzee
By
John ... Darley
Attorney.

Patented Mar. 15, 1949

2,464,538

UNITED STATES PATENT OFFICE 2,464,538

FLUID PRESSURE OPERATED MULTIPLE CLUTCH

Harry H. Vanderzee, Racine, Wis., assignor to Twin Disc Clutch Company, Racine, Wis., a corporation of Wisconsin Application February 27, 1946, Serial No. 650,472

8 Claims. (Cl. 192—87)

My invention relates to a power transmission for interposing between driving and driven shafts, including capacity for speed reduction and reversing, and is more particularly concerned with providing a transmission of this character for marine service.

In marine power installations, particularly those employing internal combustion engines, it is necessary to step down the speed of the engine to a point that is satisfactory for the efficient operation of the propeller. Ordinarily, this reduction is effected through a suitable arrangement of gearing which includes reversing means. The reduction features of this invention, however, may be omitted wherever desired, as it simply constitutes an ancillary phase of the transmission.

One object of the invention is to devise a transmission which incorporates direct and reverse driving gears whose selection is determined by the operation of hydraulically controlled clutches, one each for the direct and reverse drives, and in which the engaged clutch is subjected to constantly acting liquid pressure.

A further object is to provide a transmission of the character indicated in which the cylinders for the hydraulically operated clutches are constantly filled with oil under pressure to compensate for leakage and insure quicker action, the pressure in the cylinder of the engaged clutch being higher than that in the cylinder of the disengaged clutch.

A further object is to devise a dual, hydraulically operated, clutch mechanism for controlling the transmission in which the oppositely acting pistons are tied together for simultaneous movement, thereby counteracting pressures set up in the cylinders by centrifugal force acting on the working liquid.

A further object is to devise a hydraulically operated, clutch mechanism in which provision is made for preventing the working liquid from being fed too rapidly to the cylinders to insure a relatively slow and cushioned take-up of the load.

A further object is to devise an inexpensive and simple method of providing a multi-passage path in a shaft for delivering oil to hydraulically actuated clutches which involves the use of telescoped tubes.

A further object is to devise a marine gear as indicated which incorporates an arrangement for transmitting the propeller thrust directly to the hull of the ship as contrasted with the usual practice of delivering this thrust to the gear housing and thence to the hull.

These and further objects of the invention will be set forth in the following specification, reference being had to the accompanying drawings, and the novel means by which said objects are effectuated will be definitely pointed out in the claims.

In the drawings:

Fig. 4 is a schematic view of the hydraulic system for operating the clutches.

Fig. 5 is an enlarged, sectional view of the pressure relief valve which regulates the amount of hydraulic pressure in each cylinder of the dual clutches, the section being taken along the line 5—5 in Figs. 2 and 6 and the valve being shown in non-relieving position.

Figure 2:
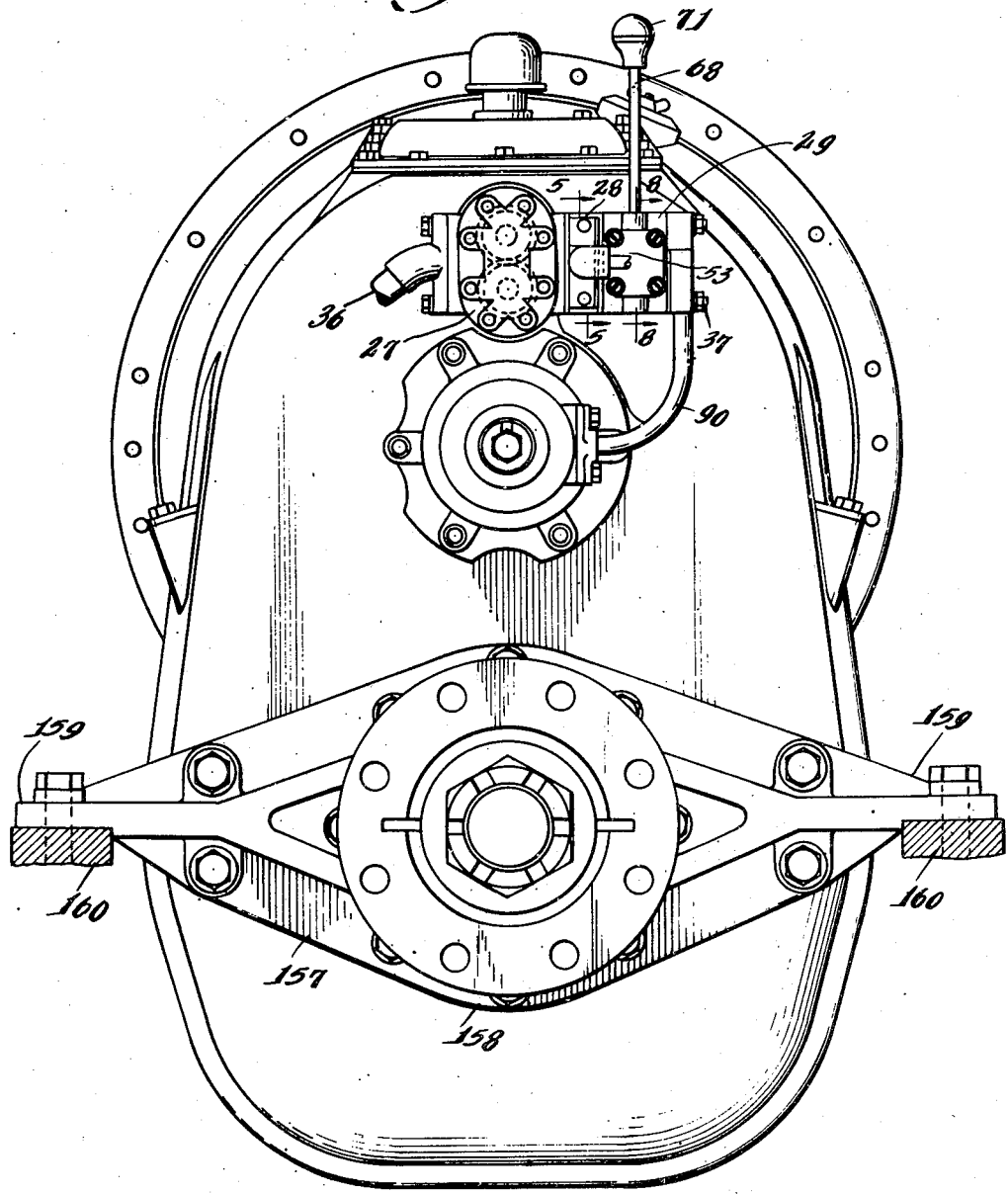
Fig. 2 is an end view of the transmission looking in the direction of the arrow 2 in Fig. 1.

Figs. 6 and 7 are end and plan views of the relief valve looking in the direction of the arrows 6 and 7, respectively, in Fig. 5, Fig. 6 showing the valve as it appears in Fig. 2.

Fig. 8 is an enlarged section of the operating valve for controlling the dual, hydraulically operated, clutch mechanisms, the section being taken along the line 8—8 in Figs. 2 and 9 and the valve being shown in neutral position.

Figs. 9 and 10 are end and plan views of the operating valve looking in the direction of the arrows 9 and 10, respectively, in Fig. 8, Fig. 9 showing the valve as it appears in Fig. 2.

Fig. 11 is a sectional view of the main shaft of the transmission showing the concentric tube arrangement for delivering working liquid to the clutch cylinders.

Figure 1:
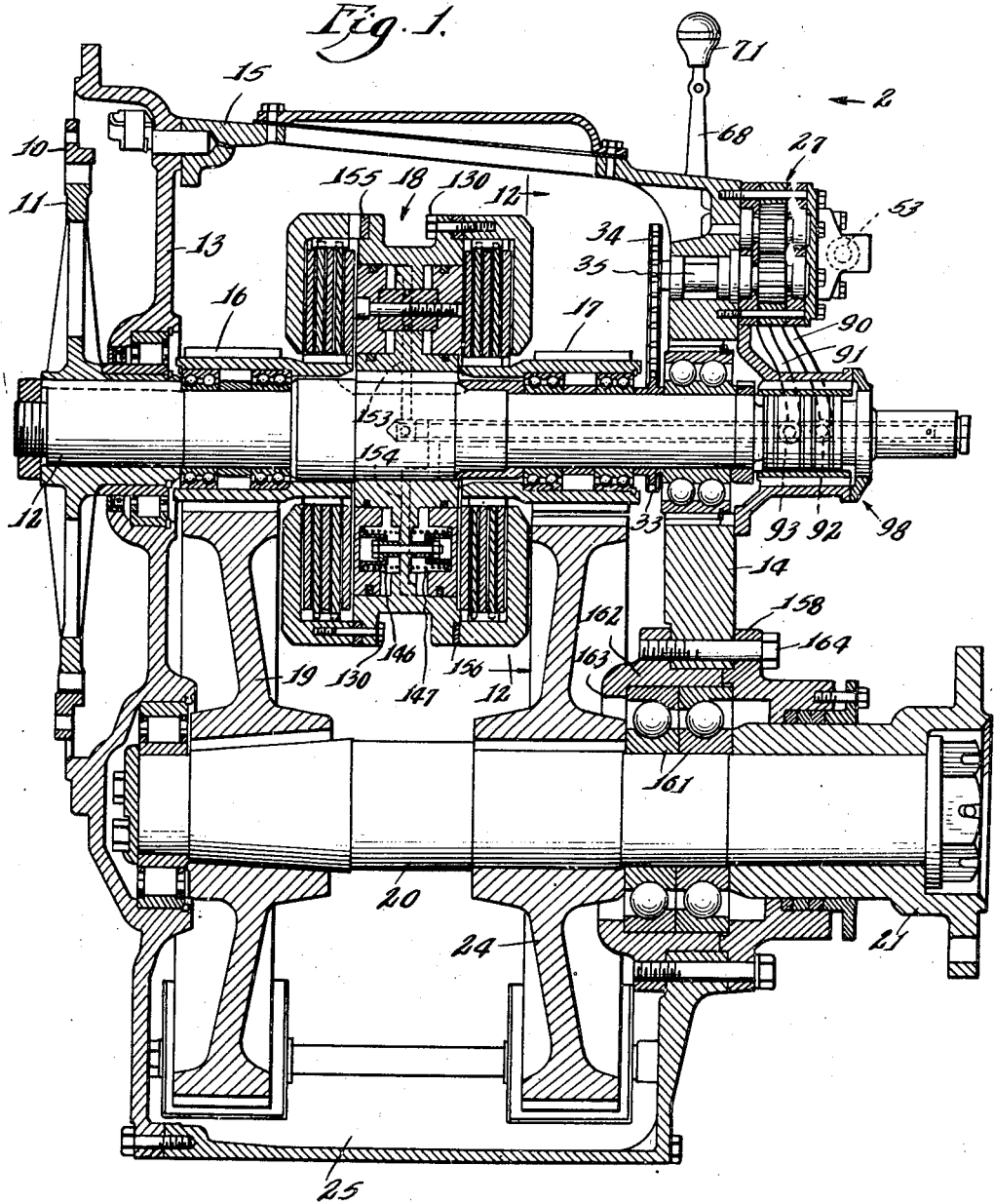
Fig. 1 is a sectional elevation of the transmission showing the dual clutch mechanisms in neutral position.

Fig. 12 is a fragmentary section along the line 12—12 in Fig. 1 showing the idler gear for transmitting a reverse drive to the countershaft.

Fig. 13 is a section along the line 13—13 in Fig. 12.

Fig. 14 is a sectional elevation of a modified form of relief valve corresponding to the valve shown in Fig. 5, the section being taken along the line 14—14 in Fig. 15.

Fig. 15 is a plan view looking in the direction of the arrow 15 in Fig. 14.

Referring to Fig. 1 of the drawings, the numeral 10 designates an internally toothed, driving ring which may be bolted to a driving member, such as an engine flywheel (not shown), and which is in constant mesh with a peripherally toothed, driven spider 11 that is keyed to a main shaft 12. The shaft 12 is journaled in the front and rear walls 13 and 14, respectively, of a housing 15. Freely journaled on the shaft 12 adjacent the wall 13 is a pinion 16 and a like pinion 17 is similarly mounted on the shaft adjacent the wall 14. Selective operation of the pinions 16 and 17 is effected by hydraulically operated, dual clutch mechanisms generally indicated by the numeral 18 and hereinafter described. The pinion 16 is in constant mesh with a gear 19 keyed to a countershaft 20 that is also journaled in the end walls 13 and 14 and has secured thereto externally of the housing a coupling part 21 for attachment to a propeller shaft (not shown), thus providing for direct drive through the transmission. The pinion 17 is drivably connected through an idler gear 22 (see Figs. 12 and 13) that is journaled on a stub shaft 23 carried by the rear wall 14 with a gear 24 keyed to the countershaft 20, thus providing for reverse drive when the associated clutch mechanism is actuated.

The hydraulic system for controlling the direction of drive through the transmission is schematically illustrated in Fig. 4 wherein the numeral 25 designates a sump for the working liquid which characteristically is the lubricating oil for the transmission and the sump ordinarily being constituted by the lower portion of the transmission housing 15. The oil is drawn from the sump 25 through a filter 26 by a gear pump 27 and is forced under pressure through a relief valve 28 and an operating valve 29 to the clutch actuating cylinders 30 and 31 in the manner presently described. The arrangement is such that when the operating valve 29 is in a neutral position, corresponding to the similar position of the transmission, the relief valve 28 provides for a relatively low pressure, for example, about five pounds per square inch, in the cylinders 30 and 31, thereby insuring that the cylinders are constantly filled to compensate for leakage and further insuring a rapid increase in the pressure in either cylinder depending upon the direction of movement of the operating valve 29. When the valve 29 is shifted to a forward drive position, the pressure in the forward drive cylinder 30 is increased rapidly to an actuating pressure of, for example, one hundred pounds, while that in the cylinder 31 remains at five pounds. For reverse drive, the pressure conditions in the cylinders are reversed. In the hydraulic system, that oil which does not reach the cylinders is passed through a cooler 32 en route to the sump 25, thus completing the cycle.

Figure 3:
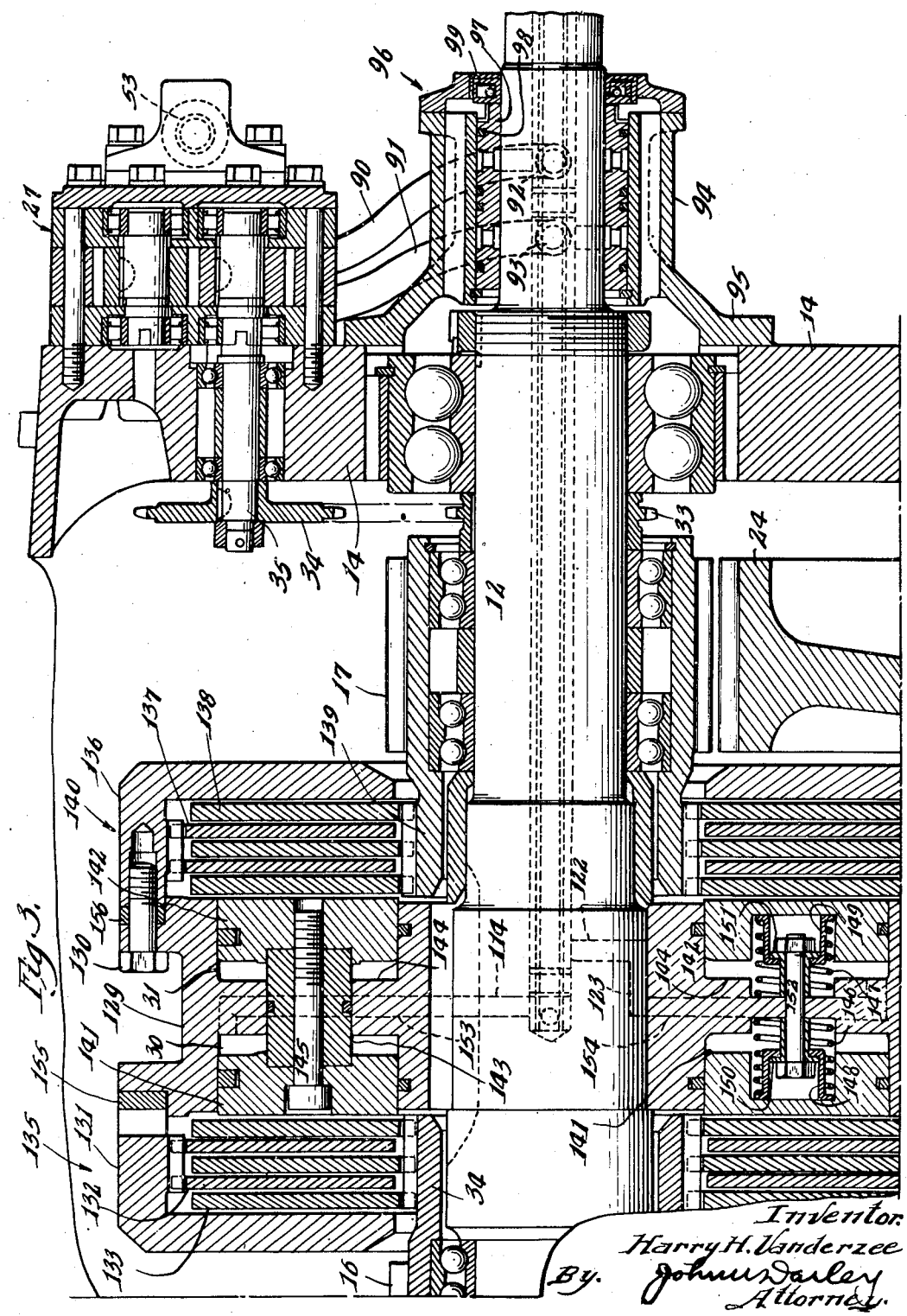
Fig. 3 is an enlarged, sectional view of the upper portion of the transmission as it appears in Fig. 1.

Referring to Figs. 1 and 3, the numeral 33 designates a sprocket which is keyed to the shaft 12 and drivably connected to a sprocket 34 fast on a shaft 35 that is journaled in the rear wall 14. The shaft 35 provides drive for the oil pump 27 that is supported on the wall 14 and which draws oil from the filter 26 (see Fig. 4) through a pipe 36 (see Figs. 2 and 4). The relief valve 28 abuts the pump 27 on the discharge side thereof and is abutted in turn by the operating valve 29 (see Fig. 2), the pump and relief and operating valves constituting a compact pressure producing and control unit that is hung in an accessible location on the exterior of the housing 15 with the valves being attached to the pump by tie rods 37 (see Figs. 2, 6 and 9).

Referring to Figs. 2, 5, 6 and 7, the valve 28 comprises a casing 38 having in the face 39 thereof which abuts the pump an elongated port 40 that connects the discharge side of the pump with the left end, as viewed in Fig. 5, of a cylindrical chamber 41 that extends lengthwise of the casing, or fore and aft of the transmission housing 15. The left end of the chamber 41 is included within an end wall 42 of the casing which also serves to close the adjacent portion of the chamber while the opposite end of the chamber is closed by a cover 43. Between the cover 43 and the adjacent surface of the wall 42, the casing 38 is cored to provide upper and lower pockets 44 and 45, respectively, which extend oppositely from and communicate with the chamber 41, the width of each pocket being less than the diameter of the chamber 41. The face of the cover 43 which abuts the casing 38 includes a vertically elongated recess 46 that registers with the pockets 44 and 45 and bridges the adjacent end of the chamber 41. Slidably mounted in the chamber 41 is a valve 47 which on its right side, as viewed in Fig. 5, is cup-shaped as at 48 to receive one end of a helical spring 49 whose opposite end bears against a washer 50 that abuts the cover 43. The spring 49 normally urges the valve 47 to the closed position shown in Fig. 5 and a stop finger 51 extending from the left side of the valve 47 contacts the left end of the chamber 41 to prevent closing movement of the valve beyond the position shown in Fig. 5 and such that the valve never masks the port 40. The spring 49 is initially loaded in the particular arrangement disclosed to require a pressure of about one hundred pounds per square inch before the valve 47 will move in an opening direction towards the right to connect the port 40 with the pockets 44 and 45.

The cover 43 includes a low pressure passage 52 which provides communication between the recess 46 and a pipe 53 (see Figs. 1, 3, 4, 5, 6 and 7) which leads to the cooler 32. The casing wall 42 is provided with horizontally disposed, L-shaped, low pressure passages 54 and 55, the former connecting at one end with the pocket 44 and the latter at one end with the pocket 45, and the opposite ends of both passages terminating at the face 56 of the casing 38 which is abutted by the operating valve 29. Also included within the end wall 42 is a port 57, similar in shape to the port 40 and oppositely related thereto, which extends between the chamber 41 and the casing face 56. Referring to Figs. 8, 9 and 10 which show the operating valve 29, the latter comprises a casing 58 having a bore 59 extending therethrough which is disposed generally fore and aft of the transmission housing 15, the ends of the bore being closed by plates 60 and 61. Slidably mounted in the bore 59 is a piston valve 62 having intermediately formed thereon spaced, annular shoulders 63 and 64 which closely fit the wall of the bore 59 and are connected by a portion 65 of reduced diameter. From the left end of the valve 62, as viewed in Fig. 8, a stem 66 extends through and in slidable and sealed relation to the plate 60 and at its outer extremity carries a pin 67 whose ends are engaged by the bifurcated parts formed on the lower, yoke-shaped end of a lever 68. The lever 68 is intermediately pivoted on a pin 69 that is bridged between arms 70—70 extending from the plate 60 and the upper portion of the lever is shaped as a hand grip 71 (see Figs. 1 and 2). In order to hold the valve 62 in any one of three positions, its right end is provided with annular grooves 72, 73 and 74 which are slightly axially spaced from each other with the groove 72 being located adjacent the shoulder 64. The grooves 72, 73 and 74 are selectively engaged by oppositely positioned balls 75—75 which are mounted in cavities 76—76 in the casing 58 and biased into groove seating position by springs 77—77. Whenever engaged by the balls 75, the grooves 72, 73, and 74, as the case may be, respectively determine the forward, neutral and reverse positions of the valve 62.

The face 78 of the casing 58 abuts the face 56 of the relief valve casing 38 and a relatively small diameter passage 79 in the former casing always provides communication between the port 57 in the casing 38 and the annular chamber 80 in the bore 59 between the shoulders 63 and 64, regardless of the position of the valve 62. The ends of the low pressure passages 54 and 55 in the casing 38 which terminate at the face 56 thereof register, respectively, with the ends of passages 81 and 82 in the casing 58 which terminate at the face 78 thereof. The opposite ends of passages 81 and 82 communicate with low pressure chamber 83 forming a portion of the bore 59 between the plate 60 and the shoulder 63.

As noted in Fig. 8, an axial passage 84 extends through the valve 62 from the right end thereof to an annular enlargement 85 of the stem 66 which is positioned adjacent to and on the stem side of the shoulder 63, the diameter of the enlargement being less than the diameter of the shoulder. Radial ports 86 in the enlargement 85 provide communication between the chamber 83 and the passage 84. From the shoulder 64 to the right end of the valve 62, the valve is relieved on opposite sides as indicated by the numeral 87 in Figs. 8 and 9, thereby providing for flow of oil from the right end of the passage 84 and along the flattened portions of the valve under conditions presently described.

Passages 88 and 89 spaced axially of the bore 59 connect the latter with the inlet ends, respectively, of pipes 90 and 91 (see Figs. 1, 2, 3, 9, 10 and 11), and the opposite ends of the pipes communicate, respectively, with ports 92 and 93 (see Figs. 1, 3 and 11) spaced axially along a hub 94 that is coaxial with the shaft 12 which extends externally of the wall 14. The hub 94 is flanged at one end as at 95 for attachment to the wall 14 and forms part of a collector liquid seal generally identified by the numeral 96. The hub 94 is spaced from the shaft 12 and in the annular space thus defined is mounted a floating, carrier sleeve 97 having externally positioned thereon a plurality of piston rings 98 which are spaced axially of the sleeve and have sealing contact with the interior of the hub 94. The sleeve 97 is held against rotation in any approved manner, has journal relation to the shaft and its floating condition compensates for any misalignment between the shaft and hub 94. A shaft seal 99 appropriately carried by the outer end of the hub 94 seals the latter in this location.

Referring more particularly to Fig. 11, it will be noted that four piston rings 98 are employed, one each being disposed adjacent the ends of the sleeve 97 and two intermediately positioned. An annular channel 100 is cut in the outer surface of the sleeve 97 to constantly register with the port 92 and located between the two piston rings which are remote from the housing 15 and a similar channel 101 is radially aligned in the inner surface of the sleeve, the two channels being connected by radial passages 102. An annular channel 103, similar to the channel 100, is provided in the outer surface of the sleeve 97 between the two, innermost, piston rings 98 and in constant registration with the port 93, and radial passages 104 connect the channel 103 with an annular channel 105 formed in the inner surface of the sleeve. Radial passages 106 and 107 register at their outer ends with the channels 101 and 105, respectively, and provide constant communication therebetween and an axial bore 108 in the shaft 12 which extends from the outer end thereof and terminates midway between the pinions 16 and 17 (see Fig. 1).

Still referring to Fig. 11, there is mounted in the bore 108 a tubular assembly for directing the oil flow to the clutches. Specifically, an inner tube 109 having a diameter substantially less than the diameter of the bore 108 is positioned coaxially and with its left end abutting the inner end 110 of the bore. At a convenient distance from the left end of the tube 109, a washer 111 is firmly attached thereto and serves to support the indicated end of the tube in the bore 108. The spacing of the washer 111 from the left end of the tube defines therewith and the bore 108 an annular chamber 112 which communicates through an aperture 113 with the interior of the tube and also with the inner end of a passage 114 that extends radially of the shaft 12.

A washer 115 slidably encircles the tube 109 in spaced relation to and on the opposite side of the washer 111 with respect to the passage 114 and disposed between the washers is annular packing 116. Telescoped over the tube 109 is a second tube 117 whose outer diameter is sufficiently less than the diameter of the bore 108 to define therewith an annular passage 118 which extends from the washer 115 against which the left end of the tube 117 abuts to a washer 119 that also supportingly and slidably encircles the tube 109 and is abutted by the right end of the tube 117. The washer 119 and a similar washer 120 are spaced from each other and positioned between the radial passages 106 and 107, and between these washers is annular packing 121. The passage 118 provides communication between the radial passage 107 and hence the port 93, and the inner end of a passage 122 which extends radially outward of the shaft 12 and connects with one end of a longitudinal groove 123 cut in the outer surface of the shaft and whose opposite end terminates generally midway of the pinions 16 and 17 (see Figs. 1 and 3). A third tube 124 is telescoped over the tube 109 with its left end abutting the washer 120 and its right end extending beyond the adjacent end of the tube 109. The right end of the tube 124 is contacted by one end of a helical spring 125 that is loaded by a plug 126 threaded in the outer end of the shaft 12. By suitably compressing the spring 125, it will be obvious that, since the washer 111 provides a fixed abutment, the washers 115, 119 and 120, and the tubes 117 and 124 may be shifted towards the left to effect a squeezing of the packings 116 and 121 and sealing contact thereof with the tube 109, bore 108 and the washers 111, 115, 119 and 120. The tube 124 is spaced from the bore 108 and defines therewith an annular passage 127 which provides communication between the passage 106 and hence the port 92, and the interior of the tube 109 through an aperture 128 in that end of the tube 124 which extends beyond the adjacent end of the tube 109.

From the foregoing, it will be understood that oil delivered to the port 92 flows by way of the channel 100, passage 102, channel 101, passages 106 and 108, aperture 128, tube 109, aperture 113, and chamber 112 to the passage 114, while oil delivered to the port 93 flows by way of the channel 103, passage 104, channel 105, passages 107 and 118 to the passage 122.

Referring to Figs. 1 and 3, a cylinder ring 129 is keyed to the shaft 12 substantially midway between the pinions 16 and 17 and secured to the left end of the ring, as viewed in said figure, by cap screws such as 130 is a cup-shaped casing 131 whose peripheral portion is internally toothed for driving engagement with toothed clutch plates 132. The plates 132 are alternately related to similar plates 133 which are internally toothed for driving engagement with a toothed, tubular extension 134 forming part of the pinion 16. The radial portion of the casing 131 constitutes an abutment for the clutch plates 132 and 133 and the assemblage just described forms the forward drive clutch generally indicated by the numeral 135.

A cup-shaped casing 136, similar to the casing 131, is secured to the right end of the cylinder ring 129 by screws 130 and the former's peripheral portion is internally toothed for driving engagement with toothed clutch plates 137 which are alternately arranged with respect to clutch plates 138 that are internally toothed for driving engagement with a toothed, tubular extension 139 forming part of the pinion 17. The radial portion of the casing 136 constitutes an abutment for the clutch plates 137 and 138 which together function as the reverse drive clutch generally indicated by the numeral 140 in Fig. 3.

The clutches 135 and 140 are hydraulically operated by annular pistons 141 and 142 which are slidable in annular cylinders 30 and 31, all respectively, recessed in opposite faces of the cylinder ring 129. The pistons 141 and 142 are piloted on the ends of a plurality of carrier blocks 143 spaced around the ring 129. Only one of such blocks is shown in Fig. 3 and each is slidable through a web 144 that separates the cylinders 30 and 31 and forms part of the ring 129. The pistons 141 and 142 are tied together and to the blocks 143 for simultaneous movement by means of cap screws 145 which extend through the blocks and as a means of returning the pistons to the neutral positions shown in Figs. 1 and 3, a plurality of release spring assemblies are spaced around the cylinder ring 129, only one of which is illustrated in the last noted figures.

Each spring assembly comprises a pair of springs 146 and 147 whose inner ends abut opposite sides of the web 144 and whose outer ends bear against the outer, flanged ends of sleeves 148 and 149, all respectively. The last named ends of the sleeves 148 and 149 limit inward movement of the pistons 141 and 142 when neither piston is subjected to a pressure which engages the associated clutch and outward extensions of the springs are limited by hooking the inner ends of the sleeves 148 and 149 over the outer ends of bushings 150 and 151, respectively, which are clamped against the opposite sides of the web 144 by a common bolt 152. From the foregoing, it will be understood that whenever either piston is moved to engage its clutch, the springs on the opposite side of the web 144 are compressed and since the pistons are linked for simultaneous movement, energy is thus stored for returning the pistons to the neutral positions shown when the pressure actuating the then clutch engaging piston is released.

As noted in Figs. 1 and 3, oil under pressure is supplied to the cylinder 30 through a radial passage 153 in the web 144 whose inner end communicates with the passage 114 in the shaft 12. Similarly, the cylinder 31 is supplied through a radial passage 154 in the web which communicates with the groove 123 in the shaft and hence with the passage 122.

The operation of the transmission will now be described. In the position of parts as illustrated in the drawings, the engine to which the transmission is connected is not running and the operating valve 29 is in a neutral position (see Fig. 8). Since the shaft 12 is not rotating, the oil pump 36 is not being driven and pressure in the hydraulic system stands at zero so that the relief valve 28 is closed (see Fig. 5) and the springs 148 and 149 hold the pistons 141 and 142 in the neutral positions shown in Fig. 3.

When the engine is idling, the shaft 12 rotates and the pump 27 draws oil from the sump 25 through the filter 26 and delivers it under pressure to the port 40 in the relief valve 28 (see Figs. 5 and 6). During the initial period of engine operation, the relief valve element 47 occupies the closed position shown in Fig. 5 and, at this stage, the oil flows through the chamber 41, port 57 and passage 79 into the chamber 80 of the operating valve 29 (see Figs. 8 and 9). The valve 29 is then in the neutral position shown in Fig. 8 and the shoulders 63 and 64 thereof partly mask the inlets of and prevent direct flow from the chamber 80 to the passages 89 and 88, respectively, the oil thus being dammed in the last noted chamber. The remaining portions of the inlets to the passages 89 and 88 are not masked for a purpose presently explained. Generally speaking, when the valve 62 is in the neutral position shown, the shoulders 63 and 64 mask the inner halves of the inlets to the passages 89 and 88, respectively, leaving the outer halves of these inlets uncovered. Pressure therefore builds up in the line between the pump 27 and the chamber 80 and when it exceeds the loading of the spring 49 in the relief valve 28, which loading will be assumed as being one hundred pounds per square inch, the valve element 47 opens and bleeds the oil into the pockets 44 and 45. Part of this bled oil flows through the low pressure passages 54 and 55 in the relief valve casing 38 and the communicating passages 81 and 82, respectively, in the operating valve casing 58 into the chamber 83 in the last named casing.

In the chamber 83, the oil divides, part flowing direct to the passage 89 as permitted by the enlargement 85 and thence through the pipe 91 and associated conduit means in the shaft 12 and hub 94, as above described (see Figs. 1, 3, 10 and 11), to the reverse drive cylinder 31. The other portion of the oil in the chamber 83 flows through the ports 86 in the enlargement 85 into the passage 84 and thence along the relieved sides 87 of the grooved end of the valve 62 to the passage 88. Thereafter, this oil stream flows through the pipe 90 and the associated conduit means in the shaft 12 and hub 94 to the forward drive cylinder 30, thus completely filling both cylinders with oil.

The pressure of the oil in the cylinders 30 and 31 with the operating valve in the neutral position is determined by the following instrumentalities. A portion of the oil relieved into the pockets 44 and 45 in the relief valve casing 38 (see Figs. 4, 5, and 6) flows through the overflow passage 52 and pipe 53 to the cooler 32 and thence to the sump 25. The resistance thus imposed on the overflow to the sump creates a pressure of about five pounds per square inch which will be about the pressure on the oil in the cylinders 30 and 31. This arrangement maintains each cylinder filled with oil at all times, thus compensating for leakage past the piston rings and promoting quicker engaging movement of either piston since it is unnecessary to first fill the associated cylinder.

To engage the forward drive clutch 135, for example, the operating valve handle 68 is rocked counterclockwise to shift the valve 62 towards the right, as viewed in Fig. 8, until the balls 75 engage the groove 72 which determines the forward drive position of the valve 62. The shoulder 64 then has been moved sufficiently to uncover the portion of the inlet to the passage 88 theretofore masked so that high pressure oil may flow direct from the restricted passage 79 across the chamber 80 to the passage 88 and thence to the forward drive cylinder 30, while at the same time, the shoulder 64 masks that portion of the inlet to the passage 88 which had been open to low pressure oil flowing out of the passage 84. The piston 141 is accordingly shifted towards the left (see Fig. 3) to engage the forward drive clutch 135 and thus establish drive through the pinion 16 and connected gearing to the shaft 20. At the same time, the shoulder 63 further uncovers the inlet to the passage 89 so that only low pressure oil continues to flow to the cylinder 31. Specifically, the pressure in the cylinder 30 is about equal to the pressure at which the valve element 48 (see Fig. 5) relieves, for example, one hundred pounds per square inch, while that in the cylinder 31 is about equal to the pressure in the pockets 44 and 45, or about five pounds per square inch.

To reverse the drive through the transmission, the operating valve handle 68 is rocked clockwise (see Fig. 8), thus shifting the valve 62 towards the left until the balls 75 seat in the groove 74. The shoulder 63 then prevents low pressure oil from flowing to the passage 89 while uncovering this passage for direct communication with the high pressure passage 79, thus enabling high pressure oil to flow to the cylinder 31 and shift the piston 142 to engage the reverse drive clutch 140. At the same time, the shoulder 64 is moved to completely uncover the inlet to the passage 88 for the admission of low pressure oil from the passage 84 in the valve 62 while preventing high pressure oil from reaching the passage 88. The reversing clutch 140 is thus engaged and the forward clutch 135 disengaged. The disengagement of the latter clutch is assisted by the extending action of the springs 147 (see Fig. 3) which were compressed when the direct drive piston 141 was engaged and release for the reversing piston 142 will be provided by the springs 146 when the drive through the transmission is shifted from reverse to direct, or to neutral.

A feature of the construction resides in the restricted passage 79 in the operating valve casing 58 (see Figs. 8 and 9). As already noted, this passage constitutes a part of the high pressure oil line to the cylinder of the clutch being engaged and its purpose is to control the flow of oil so that it is not fed too rapidly to the cylinder in the initial stage of clutch engagement, thus providing for relatively slow and cushioned take-up of the load.

The tying of the pistons 141 and 142 together for simultaneous movement constitutes a further advantage of the construction. If the pistons were capable of independent movement, centrifugal action may set up a pressure on the oil in the cylinder of the released clutch sufficient to move the associated piston to engaging position against the action of any spring tending to hold the piston in release position. Inadvertent engagement of the released clutch is thereby avoided.

The manner in which the oil is conducted through the shaft 12 to the cylinders 30 and 31 is a further feature of the invention. The use of the telescoped, tubular construction provides a relatively simple and inexpensive arrangement for separating the oil passages and requires only a single bore in the shaft.

As a safety measure for use in the event that oil pressure should fail and to insure power drive through the transmission in either direction, a spacer ring 155, preferably segmented (see Figs. 1 and 3), is normally clamped between the cylinder ring 129 and the peripheral portion of the casing 131 by the cap screws 130 and like screws 130 normally clamp a spacer ring 156, also preferably segmented, between the ring 129 and the peripheral portion of the casing 136. The thickness of each spacer ring is such as to enable the plates of the clutch associated therewith to freely separate and assume released positions. Hence, if hydraulic operation becomes impossible and forward drive is desired, it is merely necessary to remove the spacer ring 155 and tighten the associated screws 130 until the plates 132 and 133 are clamped between the casing 131 and the cylinder ring 129. For reverse drive, the spacer ring 156 is removed and the associated bolts 130 tightened to clamp the plates 137 and 138.

Where transmissions of this type are employed in marine service, provision must be made for taking the thrust of the propeller shaft. In small craft installations, this problem is ordinarily met by transferring the thrust to the housing of the transmission which is bolted to the hull. This construction requires a relatively heavy housing which is objectionable in small boats. In the present instance, this problem is solved by transferring the thrust to a sturdy cross arm whose ends are anchored to the hull and which is associated with a bearing in which the countershaft 20 is journaled.

Referring to Figs. 1 and 2, the numeral 157 designates the cross arm which is disposed transversely of the shaft 20 and externally of the housing 15. The central portion 158 of the arm encircles the coupling part 21 and abuts the housing wall 14 while the oppositely extending ends 159—159 are rigidly secured to the hull 160. The shaft 20 is journaled in a pair of abutting, thrust, ball bearings 161—161 which are carried in a sleeve 162 having an annular retaining flange 163 which bears against the outer race of the inner bearing 161, the inner race of the outer bearing 161 being contacted by the coupling part 21. The arm portion 158 and the sleeve 162 are secured together by bolts 164 extending through the housing wall 14. From the foregoing, it will be obvious that the propeller thrust applied to the coupling part 21 is transmitted through the bearings 161, sleeve 162 and bolts 164 to the cross arm 157 and thence to the hull.

Where a cooler 32 is not used with the transmission, an auxiliary, pressure relieving means must be used in conjunction with the main relief valve to insure the desired low pressure in either or both of the cylinders. The modified relief valve is identical with the valve shown in Fig. 5, except for the auxiliary feature, so like parts are identified by like numerals primed.

Referring to Figs. 14 and 15, the relief valve casing 38' is closed by a cover 165 whose inner face includes a recess 166, similar to the recess 46, which registers with the pockets 44' and 45' and bridges the adjacent end of the chamber 41'. The cover is also provided with a chamber 167 which is aligned with the chamber 41' and provides a means of communication between the recess 166 and a lateral passage 168 when the latter is uncovered by the auxiliary valve means presently described. The passage 168 connects through a pipe 169 with the sump 25.

An auxiliary relief valve 170 is slidable in the chamber 167 and its right end, as viewed in Fig. 14, is cup-shaped to provide an annular wall 171. A helical spring 172 is interposed between the closed end of the chamber 167 and the cup-shaped end of the valve 170 and tends to maintain the valve in the position shown in Fig. 14 wherein it denies communication between the recess 166 and the passage 168. A stop finger 173 extends from the left end of the valve 170 into limiting contact with the washer 50'. An annular groove 174 is cut in the outer surface of the wall 171 and communicates through a radial port 175 in the wall with that portion of the chamber 167 on the cup-shaped side of the valve 170. In all positions of the valve, the groove 174 is in communication with the passage 168 so that the only restraint on opening movements of the valve is that imposed by the spring 172.

Under operating conditions, whenever the main relief valve 48' opens, as above described for the valve 48, pressure in the pockets 44' and 45' will be determined by the loading of the spring 172 which is about five pounds per square inch. When this pressure is exceeded, the auxiliary relief valve 170 shifts to the right to uncover the passage 168 and discharge the excess or overflow oil to the sump through the pipe 169. Hence, when the operating valve 29 is in a neutral position, the valve 170 establishes a pressure of about five pounds in the cylinders 30 and 31 and the same pressure in that cylinder which forms a part of the released clutch when the other clutch is engaged. Otherwise, the valve shown in Fig. 14 operates in the same manner as that shown in Fig. 5.

I claim:

1. In a power transmission, the combination of a pair of clutches selectively engageable to control drive through the transmission, separate hydraulically actuated means each comprising a cylinder and a piston mounted therein for engaging the associated clutch, the pistons being connected for simultaneous movement, a pump for supplying liquid under pressure to the cylinders, and valve means for controlling flow of the liquid and shiftable between positions determining an engagement of either piston and the release of the other and including means for simultaneously establishing a pressure in either cylinder sufficient to move the associated piston to engage its clutch and a lower pressure in the other cylinder sufficient to maintain a filling of the same.

2. In a power transmission, the combination of a pair of clutches selectively engageable to control drive through the transmission, separate hydraulically actuated means each comprising a cylinder and a piston mounted therein for engaging the associated clutch, the pistons being connected for simultaneous movement, and a hydraulic circuit of which each cylinder constitutes a part comprising a liquid source, a pump for supplying liquid under pressure from the source to the cylinders, and control means for the liquid discharged by the pump comprising an operating valve shiftable between positions determining an engagement of either piston and the release of the other, a pressure relief valve associated with the operating valve and cylinders and arranged to establish a predetermined liquid pressure in the cylinder of the engaged piston, and conduit means connecting the discharge side of the relief valve and source, the flow resistance exercised by the conduit means setting up a relatively lower pressure in the cylinder of the unengaged piston.

3. In a power transmission, the combination of a pair of clutches selectively engageable to control drive through the transmission, separate hydraulically actuated means each comprising a cylinder and a piston mounted therein for engaging the associated clutch, the pistons being connected for simultaneous movement, and a hydraulic circuit of which each cylinder constitutes a part comprising a liquid source, a pump for supplying liquid under pressure from the source to the cylinders, and control means for the liquid discharged by the pump comprising an operating valve shiftable between positions determining an engagement of either piston and the release of the other, a pressure relief valve associated with the operating valve and cylinders and arranged to establish a predetermined liquid pressure in the cylinder of the engaged piston, and a cooler connecting the discharge side of the relief valve and source, the flow resistance exercised by the cooler setting a relatively lower pressure in the cylinder of the unengaged piston.

4. In a power transmission, the combination of a pair of clutches selectively engageable to control drive through the transmission, separate hydraulically actuated means each comprising a cylinder and a piston mounted therein for engaging the associated clutch, the pistons being connected for simultaneous movement, and a hydraulic circuit of which each cylinder constitutes a part comprising a liquid source, a pump for supplying liquid under pressure from the source to the cylinders, and control means for the liquid discharged by the pump comprising an operating valve shiftable between positions determining an engagement of either piston and the release of the other, a main pressure relief valve associated with the operating valve and cylinders and arranged to establish a predetermined liquid pressure in the cylinder of the engaged piston, and an auxiliary pressure relief valve interposed between the discharge side of the main relief valve and source and adapted to establish a predetermined, relatively lower pressure in the cylinder of the unengaged piston.

5. In a power transmission, the combination of a pair of clutches selectively engageable to control drive through the transmission, separate hydraulically actuated means each comprising a cylinder and a piston mounted therein for engaging the associated clutch, the pistons being connected for simultaneous movement, a pump for supplying liquid under pressure to the cylinders, valve means for controlling flow of the liquid and shiftable between positions determining a release of both pistons and engagement of either piston and the release of the other and including means for simultaneously establishing a pressure in either cylinder sufficient to move the associated piston to engage its clutch and a lower pressure in the other cylinder sufficient to maintain a filling of the same, and means for moving both pistons when unengaged to release position.

6. In clutch mechanism, the combination of a pair of clutches having a common shaft and connected to separate rotary parts, respectively, the shaft having a longitudinal bore extending from one end thereof and terminating adjacent the clutches, hydraulically actuated means comprising a pair of cylinders connected to the shaft and each having a piston slidable therein for engaging an associated clutch, tube means extending through and spaced from the bore to define therewith an annular passage, the opposite ends of the tube means communicating with the passage, means of communication spaced along the shaft and connecting the passage with the cylinders, respectively, conduits spaced along the shaft for supplying liquid to the passage, sealing means in the passage between the means of communication and between the conduits whereby liquid from the conduits flows to the cylinders, respectively, and means closing the bore at the shaft end thereof.

7. In clutch mechanism, the combination of a pair of clutches having a common shaft and connected to separate rotary parts, respectively, the shaft having a longitudinal bore extending from one end thereof and terminating adjacent the clutches, hydraulically actuated means comprising a pair of cylinders connected to the shaft and each having a piston slidable therein for engaging an associated clutch, a tube extending through and spaced from the bore to define therewith an annular passage, the opposite ends of the tube communicating with the passage, means of communication spaced along the shaft and connecting the passage with the cylinders, respectively, conduits spaced along the shaft for supplying working liquid to the passage, a first, compressible, sealing ring in the passage between the means of communication, an abutment secured to and encircling the tube in juxtaposition to the ring, a second, compressible, sealing ring in the passage between the conduits and slidable along the tube, yieldable means for compressing the second ring, means for transferring the compressing force on the second ring to the first ring, and means closing the bore at the shaft end thereof.

8. In clutch mechanism, the combination of a pair of clutches having a common shaft and connected to separate rotary parts, respectively, the shaft having a longitudinal bore extending from one end thereof and terminating adjacent the clutches, hydraulically actuated means comprising a pair of cylinders connected to the shaft and each having a piston slidable therein for engaging an associated clutch, a tube extending through and spaced from the bore to define therewith an annular passage, the opposite ends of the tube communicating with the passage, means of communication spaced along the shaft and connecting the passage with the cylinders, respectively, conduits spaced along the shaft for supplying working liquid to the passage, a first, compressible, sealing ring in the passage between the means of communication, an abutment secured to and encircling the tube in juxtaposition to the ring, a second, compressible, sealing ring in the passage between the conduits and slidable along the tube, tubes telescoped along the first named tube in spaced relation to each other, one telescoping tube being disposed between the rings and the other extending from the second ring beyond the adjacent end of the first named tube, yieldable means exerting pressure against said other telescoping tube and through the second ring, first named telescoping tube and first ring against the abutment, and means closing the bore at the shaft end thereof.

HARRY H. VANDERZEE.

REFERENCES CITED

The following references are of record in the file of this patent:

UNITED STATES PATENTS

| Number | Name | Date |
|---|---|---|
| 1,827,811 | Derrick | Oct. 20, 1931 |
| 1,953,568 | Rose | Apr. 3, 1934 |